United States Patent Office 2,922,084
Patented Jan. 19, 1960

2,922,084

HIGH-VOLTAGE TESTING APPARATUS

William J. Franz, Timonium, Md., assignor to Western Electric Company, Incorporated, New York, N.Y., a corporation of New York Application September 20, 1957, Serial No. 685,265

1 Claim. (Cl. 317—135)

This invention relates to high-voltage testing apparatus, and more particularly to a control circuit for assuring that power may be supplied to only one of a plurality of electrical test rooms at any one time and that no power may be supplied to a particular room while any extrance to that room is open.

In the manufacture of communications cable it is sometimes required to subject the cable to a very high potential during electrical testing thereof, in some instances as much as 20,000 volts, such as in a core to sheath breakdown test set for finished reels of cable. In order to provide a maximum safety for the test operator and others who may be in the vicinity, individual test rooms have been provided wherein the reel of cable is positioned during the test operation.

For safety reasons it is important that no high voltage be supplied to a test room while any door thereto is open. Further, it is essential that, while high voltage testing is being performed in any one room, high voltage not be obtainable in any of the other rooms. This will enable an operator in complete safety to connect high voltage terminals to a reel of cable, preliminary to testing, in a second room while testing is taking place in a first room, or to disconnect a completely tested reel of cable in a third room during such time.

An object, therefore, of the invention is to provide new and improved high-voltage testing apparatus.

A further object of the invention is to provide a control circuit for interlocking a plurality of electrical test rooms.

Another object of the invention is to provide a control circuit for assuring that power may be supplied to only one of a plurality of electrical test rooms at any one time and that no power may be supplied to a particular room while any entrance to that room is open.

Apparatus for performing high-voltage tests on a succession of articles, embodying certain features of the invention, may include a plurality of test rooms, each having an entrance door and an exit door for bringing in and taking out, respectively, articles to be tested. A normally open switch is associated with each entrance door and with each exit door, and these switches are designed to be closed when the associated doors are closed. A normally open starting switch is provided for each room and is located outside of the room. The source of high-voltage is provided for testing purposes, together with a high-voltage supply line extending from the source to each of the rooms and means within the rooms for connecting the articles to be tested to the high-voltage supply lines.

An operating relay is associated with each test room, each operating relay having a normally open contact and a normally closed contact controlled thereby. The normally open contact is disposed in the associated high-voltage supply line to permit connection of the high-voltage source to the associated test room only when the associated operating relay is energized. The normally closed contact connects the associated high-voltage supply line to ground on the room side of the normally open contact in order to ground the connecting means at all times when testing is not taking place. In addition, a plurality of control relays are provided associated one with each test room. Each control relay has a normally open contact disposed in the energization circuit for the associated operating relay, so that each operating relay may be energized only when the associated control relay has been energized. Each control relay is also provided with a number of normally closed blocking contacts arranged so that the energization circuit for each control relay passes in series through a blocking contact of every other control relay. The energization circuit for each control relay also passes in series through the normally open switches associated with the entrance and exit doors to the associated test room and the normally open starting switch associated therewith. With this arrangement, testing may take place in only one room at any one time and in any particular room only when both doors thereto have been closed and the starting switch associated therewith has been operated.

Other objects and advantages of the invention will appear from the following detailed description of a specific embodiment thereof, when read in conjunction with the appended drawings, in which.

Figure 1:
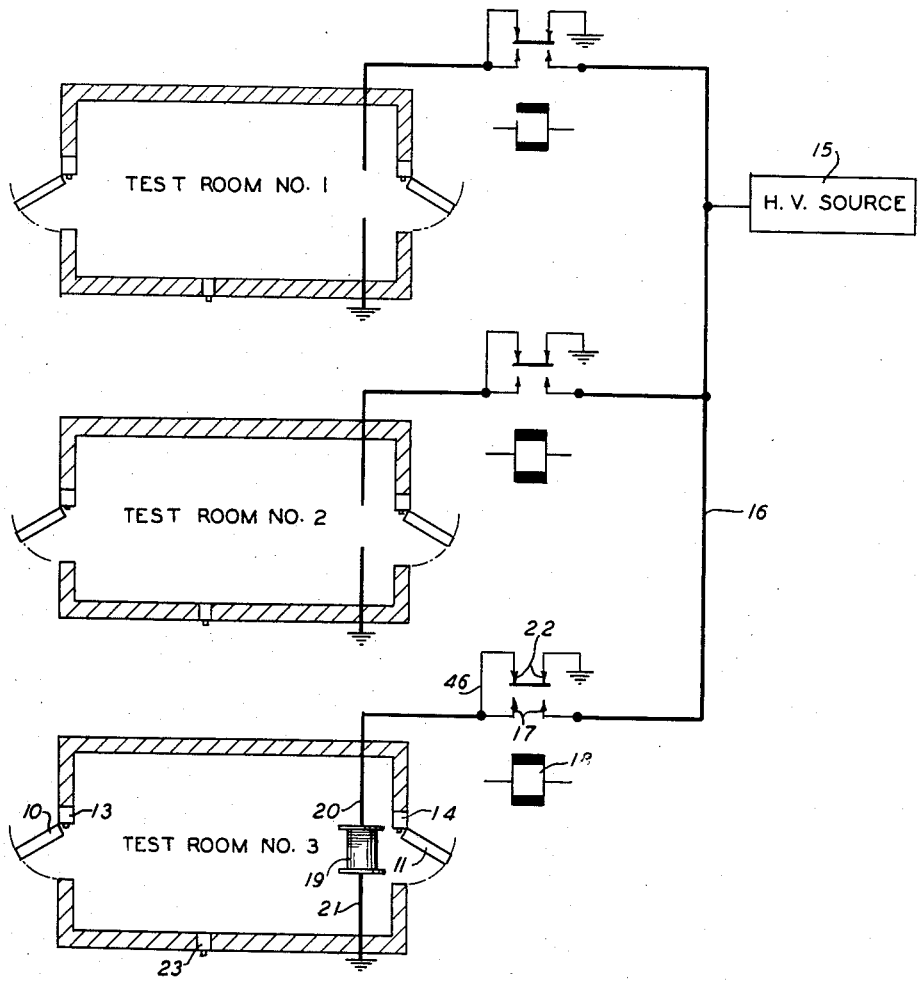
Fig. 1 is a diagrammatic view of three interlocked test rooms.

Referring now in detail to the drawings, and in particular to Fig. 1, a plurality of electrical test rooms are provided, three such rooms being shown, designated generally by the numerals 1, 2 and 3. In the following description of the control circuit and the operation thereof, the essential elements will be described only with respect to test room 3, it being understood that test rooms 1 and 2 are provided with similar elements, functioning in the same manner. Each test room is provided with two doors, such as the doors 10 and 11 for test room 3.

Test room 3 also has associated therewith a pair of microswitches 13 and 14, one positioned adjacent to and adapted to be closed upon the closing of each of the doors 10 and 11. A starting switch, such as 23, may be associated with each test room and located outside of the room so that an operator can never turn power on from inside of the room, even if all doors thereto were closed.

A high voltage source 15 extends to each test room through branch conductors, such as 16, and may supply power to room 3 only when a lower set of contacts 17 of a high voltage relay 18, associated with room 3, are closed. A reel of cable 19 to be tested may be brought into test room 3 through the door 10, then connected between a pair of high voltage terminals 20 and 21, and finally tested when the control circuit to be described hereinafter is operated properly to energize the high voltage relay 18. Upon completion of testing, the high voltage relay 18 is de-energized to close an upper set of contacts 22 thereof to ground the reel of cable 19, which then may be disconnected from the terminals 20 and 21 and removed from room 3 through the door 11.

Figure 2:
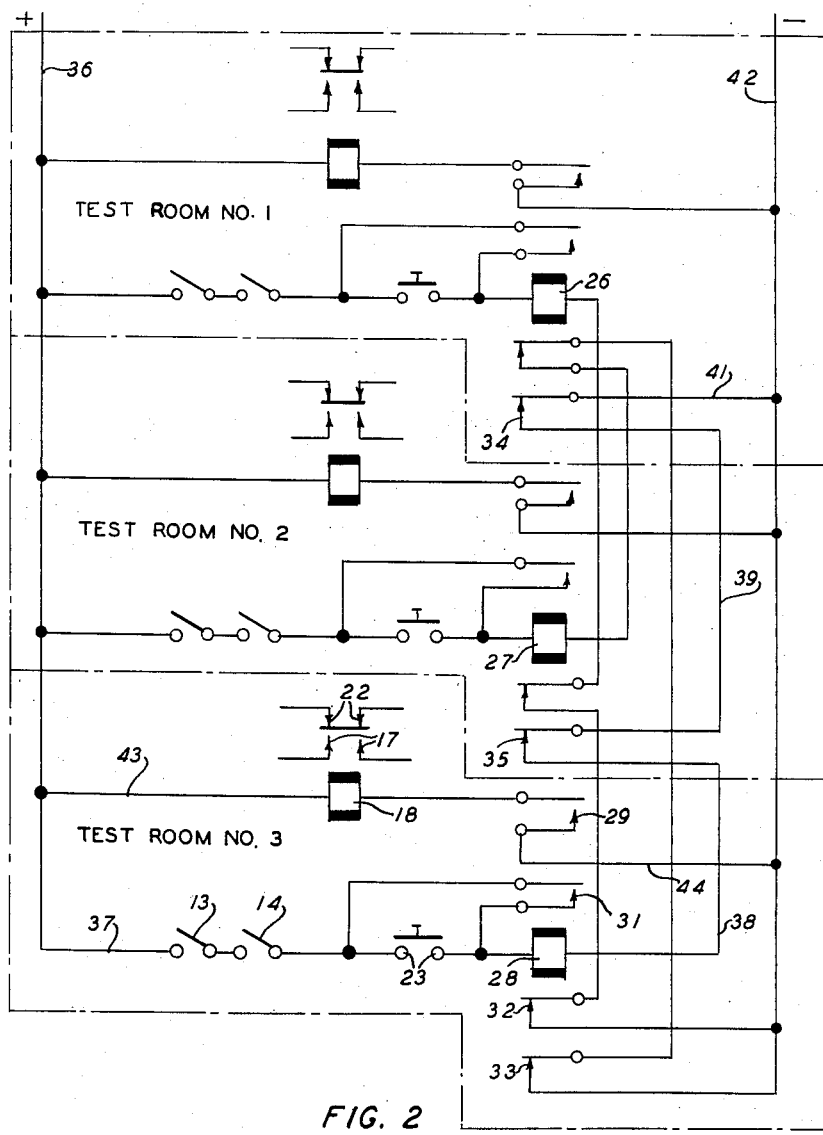
Fig. 2 is a schematic diagram of a control circuit for interlocking the test rooms shown in Fig. 1.

Referring now to Fig. 2, showing the control circuit, there are provided a plurality of operating relays 26, 27 and 28, associated with test rooms 1, 2 and 3, respectively. The operation of operating relay 28, associated with room 3, will be described fully, the relays 26 and 27 being described only insofar as they affect the operation of test room 3. Upon energization of the operating relay 28, a set of contacts 29 associated therewith close to energize the high voltage relay 18, which will then close its lower contacts 17 to permit testing in room 3, in the manner discussed previously with reference to Fig. 1.

The operating relay 28 also has associated therewith a set of latching contacts 31. Further, operating relay 28 has associated therewith two sets of normally closed blocking contacts 32 and 33, disposed in the energization circuits of the other two operating relays 26 and 27, respectively, associated with test rooms 1 and 2, respectively. Similarly, two sets of blocking contacts 34 and 35, associated with the other two operating relays 26 and 27, respectively, are disposed in the energization circuit of the operating relay 28.

The energization circuit for the operating relay 28 includes, in series: the microswitch 13, associated with the door 10 of test room 3; the microswitch 14, associated with the door 11 of test room 3; the starting switch 23, located outside of test room 3; the blocking contacts 35 of the operating relay 27, associated with test room 2; and the blocking contacts 34 of the operating relay 26, associated with test room 1. Each of the above switches and contacts must be closed before the operating relay 28 may be energized to operate the high voltage relay 18 to supply high voltage power to test room 3.

*Operation*

The operation of the control circuit is best described with reference to a specific example forming one complete cycle of operation. Assuming that all of the test rooms 1, 2 and 3 are vacant and it is desired to perform a test in room number 3, a reel of cable 19 to be tested is brought in through the door 10 and placed into position between the high voltage terminals 20 and 21 and suitably connected therebetween. The operator then leaves test room 3 and closes both the doors 10 and 11, thereby closing the associated microswitches 13 and 14, respectively. It can be seen, from an inspection of Fig. 2, that the operating relay 28, associated with room 3, cannot be energized to permit a supply of high voltage to room 3 at any time either of the microswitches 13 and 14 associated with the doors 10 and 11, respectively, are open, thus positively preventing a supply of high voltage to that room while any door thereto is open.

After both the doors 10 and 11 are closed, the operator closes the starting switch 23 to permit energization of the operating relay 28 only if neither of the other operating relays 26 or 27 are energized, which would result in one of the sets of contacts 34 or 35, respectively, being open. The energization circuit for the operating relay 28 may be traced from a positive bus 36 to a branch conductor 37, through the now closed contacts 13 and 14, through the now closed starting switch 23, through the coil of the operating relay 28, over a conductor 38, through the normally closed blocking contacts 35 of the operating relay 27 associated with test room 2, over a conductor 39, through the normally closed contacts 34 of the operating relay 26 associated with test room 1, over a conductor 41, and thence to a negative bus 42.

Upon completion of this circuit, the operating relay 28 will energize and will latch around the starting switch 23 through the latching contacts 31. It will be seen that, upon opening either of the doors 10 or 11 to test room 3, one of the contacts 13 or 14, respectively, will be opened to immediately disconnect this energization circuit for operating the relay 28 and thus prevent a supply of high voltage to room 3 while either of the doors thereto are open.

Upon energization, the operating relay 28 closes the contacts 29 thereof to energize the high voltage relay 18 through a branch conductor 43, the high voltage relay 18, the now closed contacts 29, and a branch conductor 44. Upon energization, the high voltage relay 18 closes its lower contacts 17 to supply high voltage to room 3 for test purposes. This circuit may be traced (Fig. 1) from the source 15, through the branch conductor 16, through the now closed contacts 17 to the terminal 20, through the reel of cable 19 under test, and through the terminal 21 to ground.

When the high voltage relay 18 is de-energized, upon completion of testing or for any other reason, the power supply contacts 17 will open and the ground extending contacts 22 will close to ground off, through a conductor 46, any potential accumulated on the reel of cable 19.

Energization of the operating relay 28 also results in the opening of the blocking contacts 32, disposed in the energization circuit of the operating relay 26, associated with room 1, to positively preclude a supply of high voltage to that room through the inability to establish a circuit to energize the relay 26. Similarly, the blocking contacts 33 are opened to preclude a supply of high voltage to room 2 through the inability to establish a circuit to energize the operating relay 27. In this manner, it can be seen that the closing of the doors to and the actuation of the starting switch for any test room will not be effective to permit a supply of high voltage to that room, as long as the operating relay for any other room is energized.

If desired, additional microswitches (not shown) may be associated with each door to every room to disable the high voltage source except when all doors to at least one room are closed.

It will be manifest that this invention is not limited to the specific details described in connection with the above embodiment of the invention and that various modifications may be made without departing from the spirit and scope thereof.

What is claimed is:

Apparatus for performing high-voltage tests on a succession of articles, which comprises: a plurality of test rooms, each having an entrance door and an exit door for bringing in and taking out, respectively, articles to be tested; a normally open switch associated with each entrance door and designed to be closed when the associated entrance door is closed; a normally open switch associated with each exit door and designed to be closed when the associated exit door is closed; a plurality of normally open starting switches associated one with each test room and located outside of the associated room; a source of high voltage for testing purposes; a plurality of high-voltage supply lines, one extending from said high-voltage source to each of said test rooms; means within said test rooms for connecting the articles to be tested to the high-voltage supply lines; a plurality of operating relays associated one with each test room, each operating relay having a normally open contact and a normally closed contact controlled thereby, the normally open contact being disposed in the associated high-voltage supply line to permit connection of said high-voltage source to the associated test room only when the associated operating relay is energized, the normally closed contact connecting the associated high-voltage supply line to ground on the room side of the normally open contact in order to ground said connecting means at all times when testing is not taking place; and a plurality of control relays associated one with each test room, each control relay having a normally open contact disposed in the energization circuit for an associated operating relay so that each operating relay may be energized only when the associated control relay has been energized, each control relay having a number of normally closed blocking contacts arranged so that the energization circuit for each control relay passes in series through a blocking contact of every other control relay, the energization circuit for each control relay also passing in series through the normally open switches associated with the entrance and exit doors to the associated test room and the normally open starting switches associated therewith, whereby testing may take place in only one room at any time and in any particular room only when both doors thereto have been closed and the starting switch associated therewith has been operated.

References Cited in the file of this patent

UNITED STATES PATENTS 2,602,150    Hauck    July 1, 1952
2,827,977    Moore    Mar. 25, 1958